US008495603B2

(12) United States Patent
Archer et al.

(10) Patent No.: US 8,495,603 B2
(45) Date of Patent: Jul. 23, 2013

(54) GENERATING AN EXECUTABLE VERSION OF AN APPLICATION USING A DISTRIBUTED COMPILER OPERATING ON A PLURALITY OF COMPUTE NODES

(75) Inventors: Charles J. Archer, Rochester, MN (US); Michael A. Blocksome, Rochester, MN (US); Joseph D. Ratterman, Rochester, MN (US); Albert Sidelnik, Champaign, IL (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 956 days.

(21) Appl. No.: 12/189,336

(22) Filed: Aug. 11, 2008

(65) Prior Publication Data
US 2010/0037035 A1 Feb. 11, 2010

(51) Int. Cl.
*G06F 9/44* (2006.01)
(52) U.S. Cl.
USPC .......................................... 717/149; 717/140
(58) Field of Classification Search
USPC ................................................ 717/149, 140
See application file for complete search history.

(56) References Cited

U.S. PATENT DOCUMENTS

| | | | |
|---|---|---|---|
| 5,063,562 A | 11/1991 | Barzilai et al. | |
| 5,095,444 A | 3/1992 | Motles | |
| 5,414,839 A | 5/1995 | Joshi | |
| 5,491,691 A | 2/1996 | Shtayer et al. | |
| 5,859,981 A | 1/1999 | Levin et al. | |
| 5,862,381 A | 1/1999 | Advani et al. | |
| 5,912,893 A | 6/1999 | Rolfe et al. | |
| 5,918,020 A | 6/1999 | Blackard et al. | |
| 5,937,201 A | 8/1999 | Matsushita et al. | |
| 5,953,336 A | 9/1999 | Moore et al. | |
| 5,982,771 A | 11/1999 | Caldara et al. | |
| 5,999,734 A | * 12/1999 | Willis et al. | ................... 717/149 |
| 6,057,839 A | 5/2000 | Advani et al. | |
| 6,115,357 A | 9/2000 | Packer et al. | |
| 6,118,777 A | 9/2000 | Sylvain | |
| 6,126,331 A | 10/2000 | Komatsu et al. | |
| 6,167,490 A | 12/2000 | Levy et al. | |

(Continued)

OTHER PUBLICATIONS

Willis, "MinSim: Optimized, Compiled VHDL Simulation Using Networked & Parallel Computers", 1993, Proceedings of Fall 1993 VHDL International User's Forumn, p. 137-144.*

(Continued)

*Primary Examiner* — Li B Zhen
*Assistant Examiner* — Duy Khuong Nguyen
(74) *Attorney, Agent, or Firm* — Biggers & Ohanian LLP

(57) ABSTRACT

Methods, apparatus, and products are disclosed for generating an executable version of an application using a distributed compiler operating on a plurality of compute nodes that include: receiving, by each compute node, a portion of source code for an application; compiling, in parallel by each compute node, the portion of the source code received by that compute node into a portion of object code for the application; performing, in parallel by each compute node, inter-procedural analysis on the portion of the object code of the application for that compute node, including sharing results of the inter-procedural analysis among the compute nodes; optimizing, in parallel by each compute node, the portion of the object code of the application for that compute node using the shared results of the inter-procedural analysis; and generating the executable version of the application in dependence upon the optimized portions of the object code of the application.

15 Claims, 11 Drawing Sheets

U.S. PATENT DOCUMENTS

| | | | |
|---|---|---|---|
| 6,253,372 | B1 | 6/2001 | Komatsu et al. |
| 6,336,143 | B1 | 1/2002 | Diedrich et al. |
| 6,343,339 | B1 | 1/2002 | Daynes |
| 6,438,702 | B1 | 8/2002 | Hodge |
| 6,490,566 | B1 | 12/2002 | Schmidt |
| 6,600,721 | B2 | 7/2003 | Edholm |
| 6,772,255 | B2 | 8/2004 | Daynes |
| 6,775,703 | B1 | 8/2004 | Burns et al. |
| 6,839,829 | B1 | 1/2005 | Daruwalla et al. |
| 7,032,224 | B2 | 4/2006 | Kadakia et al. |
| 7,458,077 | B2 | 11/2008 | Duke |
| 7,478,138 | B2 | 1/2009 | Chang et al. |
| 7,480,298 | B2 | 1/2009 | Blackmore et al. |
| 7,509,244 | B1 * | 3/2009 | Shakeri et al. .................... 703/7 |
| 7,527,558 | B2 | 5/2009 | Lavoie et al. |
| 7,743,382 | B2 | 6/2010 | Schumacher et al. |
| 7,813,369 | B2 | 10/2010 | Blackmore et al. |
| 7,953,085 | B2 | 5/2011 | Chang et al. |
| 8,087,025 | B1 | 12/2011 | Graupner |
| 2001/0047458 | A1 | 11/2001 | Iizuka |
| 2002/0065930 | A1 | 5/2002 | Rhodes |
| 2002/0194392 | A1 | 12/2002 | Cheng et al. |
| 2003/0021287 | A1 | 1/2003 | Lee et al. |
| 2004/0107240 | A1 | 6/2004 | Zabarski et al. |
| 2004/0111398 | A1 | 6/2004 | England et al. |
| 2005/0138161 | A1 | 6/2005 | McDaniel et al. |
| 2005/0278453 | A1 | 12/2005 | Cherkasova |
| 2006/0075067 | A1 | 4/2006 | Blackmore et al. |
| 2006/0107262 | A1 | 5/2006 | Bodas et al. |
| 2006/0203739 | A1 | 9/2006 | Padmanab han et al. |
| 2007/0179760 | A1 | 8/2007 | Smith |
| 2007/0260746 | A1 | 11/2007 | Mirtorabi et al. |
| 2007/0294426 | A1 | 12/2007 | Huang et al. |
| 2008/0109569 | A1 | 5/2008 | Leonard et al. |
| 2008/0168177 | A1 | 7/2008 | Subramaniam |
| 2008/0240115 | A1 | 10/2008 | Briscoe et al. |
| 2009/0003344 | A1 | 1/2009 | Kumar |
| 2009/0006810 | A1 * | 1/2009 | Almasi et al. .................... 712/35 |
| 2009/0067334 | A1 | 3/2009 | Archer et al. |
| 2009/0125604 | A1 | 5/2009 | Chang et al. |
| 2009/0201832 | A1 | 8/2009 | Brown |
| 2009/0300154 | A1 | 12/2009 | Branson et al. |
| 2010/0241774 | A1 | 9/2010 | Oliszewski et al. |
| 2010/0287320 | A1 | 11/2010 | Querol et al. |
| 2012/0185873 | A1 | 7/2012 | Archer et al. |
| 2012/0210094 | A1 | 8/2012 | Blocksome et al. |

OTHER PUBLICATIONS

Nenad Stankovic Kang Zhang, Visual Programming for Message-Passing Systems (1999), International Journal of Software Engineering and Knowledge Engineering.

Matthew J. Sottile, Vaddadi P. Chandu, David A. Bader, Performance analysis of parallel programs via message-passing graph traversal, College of Computing, Georgia Institute of Technology, Feb. 25, 2006.

"MPI-2: Extensions to the Message-Passing Interface," Forum, Nov. 15, 2003.

Office Action, U.S. Appl. No. 11/946,934, Nov. 24, 2010.
Office Action, U.S. Appl. No. 11/924,934, Aug. 19, 2010.
Notice of Allowance, U.S. Appl. No. 11/764,282, Dec. 10, 2010.
Office Action, U.S. Appl. No. 11/832,192, Oct. 29, 2010.
Office Action, U.S. Appl. No. 12/166,748, May 27, 2010.
Office Action, U.S. Appl. No. 12/166,748, Aug. 25, 2010.
Notice of Allowance, U.S. Appl. No. 12/180,963, Oct. 20, 2010.
Final Office Action, U.S. Appl. No. 12,166,748, Mar. 7, 2011.
Final Office Action, U.S. Appl. No. 11,832,192, Apr. 13, 2011.
Office Action, U.S. Appl. No. 11,764,333, Apr. 13, 2011.
Final Office Action, U.S. Appl. No. 11/924,934, Feb. 24, 2011.
Notice of Allowance, U.S. Appl. No. 11/946,136, Mar. 4, 2011.
Office Action, U.S. Appl. No. 11/865,921, Feb. 2, 2011.
University of Minnesota Super Computing Institute. 2009. Derived Data Types with MPI.
William Saphir, Message Buffering and It's Effect on the Communications Performance on Parallel Computers. Apr. 1994.
University of Minnesota Super Computing Institute. 2009 MPI Performance Topics.
Final Office Action, U.S. Appl. No. 11/865,981, Jul. 22, 2011.
Huang et al., "DZM: MPI One-Sided Exploitation of LAIP API's Component Design, Communication Protocols & Application Tools Development", Jun. 6, 2006, pp. 1-70, IBM Corporation, Poughkeepsie, NY.
Tanenbaum, Andrew S., "Structured Computer Organization", 1984, Prentice-Hall, $2^{nd}$ Edition, pp. 10-12.
Final Office Action, U.S. Appl. No. 11/764,333, Sep. 2, 2011.
Office Action, U.S. Appl. No. 12/135,604, Nov. 4, 2011.
Notice of Allowance, U.S. Appl. No. 12/166,748, Nov. 9, 2011.
Willis, "MinSim: Optimized, Compiled VHDL Simulation Using Networked & Parallel Computers", 1993, Proceedings of Fall 1993 VHDL International User's Forumn, pp. 197-144.
Final Office Action, U.S. Appl. No. 11/924,934, Jan. 6, 2012.
Advisory Action, U.S. Appl. No. 11/865,981, Oct. 14, 2011.
Advisory Action, U.S. Appl. No. 11/764,333, Nov. 28, 2011.
Notice of Allowance, U.S. Appl. No. 11/832,192, Aug. 11, 2011.
Office Action, U.S. Appl. No. 12/189,336, Dec. 9, 2011.
Office Action, U.S. Appl. No. 12/189,336, Sep. 13, 2012.
Office Action, U.S. Appl. No. 12/748,579, Sep. 19, 2012.
Notice of Allowance, U.S. Appl. No. 12/847,573, Jan. 11, 2012.
Office Action, U.S. Appl. No. 13/007,905, Dec. 28, 2012.
Office Action, U.S. Appl. No. 12/985,075, Nov. 7, 2012.
Office Action, U.S. Appl. No. 13/667,456, Jan. 2, 2013.

* cited by examiner

GENERATING AN EXECUTABLE VERSION OF AN APPLICATION USING A DISTRIBUTED COMPILER OPERATING ON A PLURALITY OF COMPUTE NODES

BACKGROUND OF THE INVENTION

1. Field of the Invention

The field of the invention is data processing, or, more specifically, methods, apparatus, and products for generating an executable version of an application using a distributed compiler operating on a plurality of compute nodes.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

Just as computers have evolved into extremely complicated systems, often including thousands of nodes connected together through high-speed data communications networks, the applications that utilize modern computing systems have also evolved and become more complex. To enhance the execution efficiency of these complex applications, application developers often utilize a compiler to perform certain optimizations during the compilation and linking process to produce an executable version of the application that executes faster than an executable version not having the benefit of these optimizations. However, the drawback to this optimization procedure is that the more optimizations that a compiler explores and implements for an application, the longer the optimization process takes. In fact, application developers often seek extensive optimizations for applications, but the time required by a compiler to perform those optimization makes obtaining the optimizations prohibitive. Accordingly, application developers increasingly turn to more powerful compilers to aid the optimization process.

SUMMARY OF THE INVENTION

Methods, apparatus, and products are disclosed for generating an executable version of an application using a distributed compiler operating on a plurality of compute nodes that include: receiving, by each compute node, a portion of source code for an application; compiling, in parallel by each compute node, the portion of the source code received by that compute node into a portion of object code for the application; performing, in parallel by each compute node, inter-procedural analysis on the portion of the object code of the application for that compute node, including sharing results of the inter-procedural analysis among the compute nodes; optimizing, in parallel by each compute node, the portion of the object code of the application for that compute node using the shared results of the inter-procedural analysis; and generating the executable version of the application in dependence upon the optimized portions of the object code of the application.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
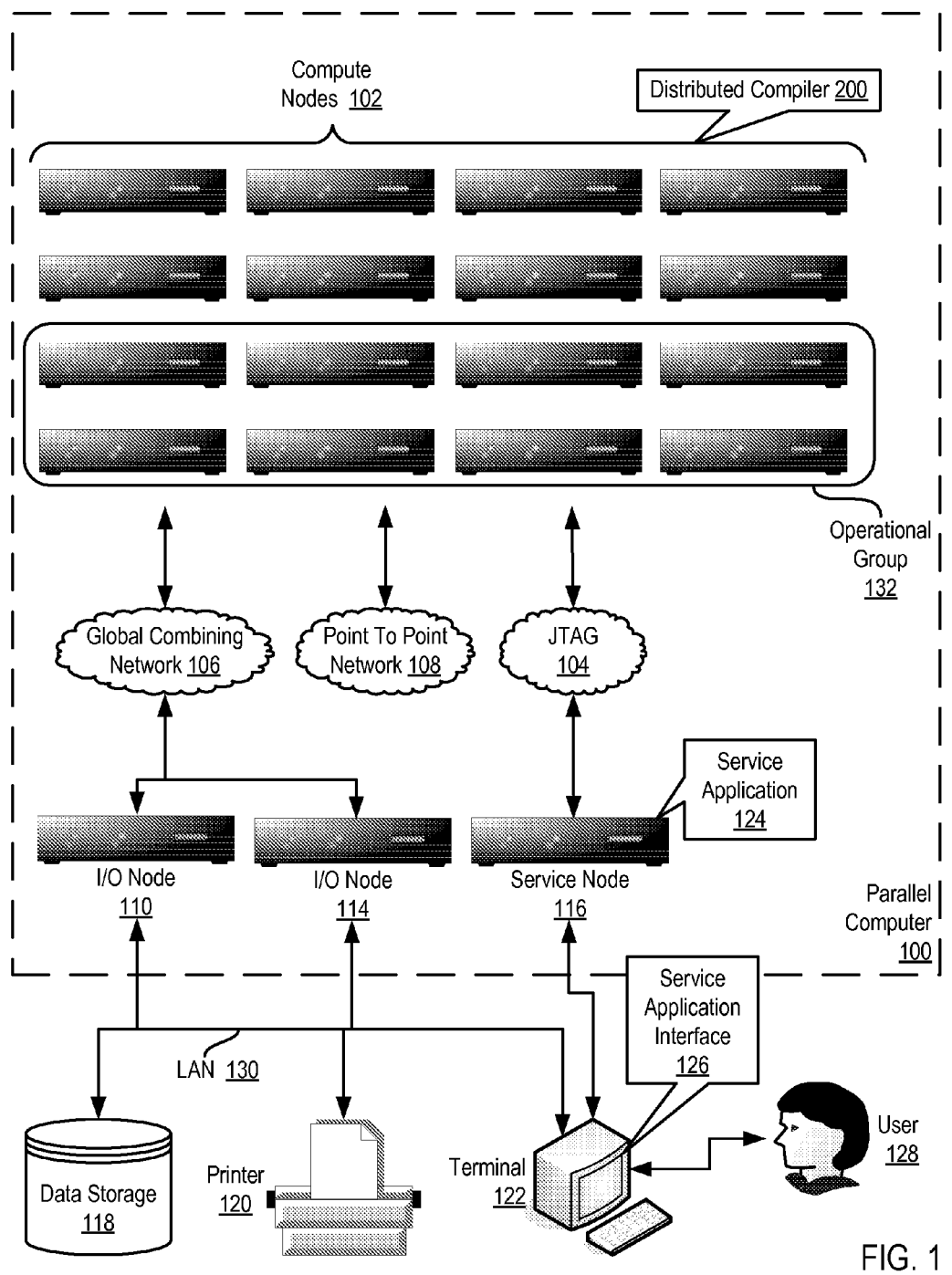
FIG. 1 illustrates an exemplary parallel computer for generating an executable version of an application using a distributed compiler operating on a plurality of compute nodes according to embodiments of the present invention.

Exemplary methods, apparatus, and computer program products for generating an executable version of an application using a distributed compiler operating on a plurality of compute nodes according to embodiments of the present invention are described with reference to the accompanying drawings, beginning with FIG. 1. FIG. 1 illustrates an exemplary parallel computer for generating an executable version of an application using a distributed compiler operating on a plurality of compute nodes in the parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102) for executing an application that processes application data.

Each compute node (102) of FIG. 1 may include a plurality of processors for use in executing an application on the parallel computer (100) according to embodiments of the present invention. The processors of each compute node (102) in FIG. 1 are operatively coupled to computer memory such as, for example, random access memory ('RAM'). Each compute node (102) may operate in several distinct modes that affect the relationship among the processors and the memory on that node such as, for example, serial processing mode or parallel processing mode. The mode in which the compute nodes operate is generally set during the node's boot processes and does not change until the node reboots.

In serial processing mode, often referred to a 'virtual node mode,' the processors of a compute node operate independently of one another, and each processor has access to a partition of the node's total memory that is exclusively dedicated to that processor. For example, if a compute node has four processors and two Gigabytes (GB) of RAM, when operating in serial processing mode, each processor may process a thread independently of the other processors on that node, and each processor may access a 512 Megabyte (MB) portion of that node's total 2 GB of RAM.

In parallel processing mode, often referred to as 'symmetric multi-processing mode,' one of the processors acts as a master, and the remaining processors serve as slaves to the master processor. Each processor has access to the full range of computer memory on the compute node. Continuing with the exemplary node above having four processors and 2 GB of RAM, for example, each slave processor may cooperatively process threads spawned from the master processor, and all of the processors have access to the node's entire 2 GB of RAM.

The compute nodes (102) are coupled for data communications by several independent data communications networks including a Joint Test Action Group ('JTAG') network (104), a global combining network (106) which is optimized for collective operations, and a point to point network (108) which is optimized point to point operations. The global combining network (106) is a data communications network that includes data communications links connected to the compute nodes so as to organize the compute nodes in a tree topology. Each data communications network is implemented with network links among the compute nodes (102). Each network link includes a physical transmission pathway between two adjacent compute nodes in network topology. That is, a network link directly connects two adjacent compute nodes in the network topology without the use of any intervening nodes. The network links provide data communications for parallel operations among the compute nodes of the parallel computer. The links between compute nodes are bi-directional links that are typically implemented using two separate directional data communications paths.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*n elements of a given data type, where n is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through the global combining network (106). The compute nodes in the parallel computer (100) are partitioned into processing sets such that each compute node in a processing set is connected for data communications to the same I/O node. Each processing set, therefore, is composed of one I/O node and a subset of compute nodes (102). The ratio between the number of compute nodes to the number of I/O nodes in the entire system typically depends on the hardware configuration for the parallel computer. For example, in some configurations, each processing set may be composed of eight compute nodes and one I/O node. In some other configurations, each processing set may be composed of sixty-four compute nodes and one I/O node. Such example are for explanation only, however, and not for limitation. Each I/O nodes provide I/O services between compute nodes (102) of its processing set and a set of I/O devices. In the example of FIG. 1, the I/O nodes (110, 114) are connected for data communications I/O devices (118, 120, 122) through local area network ('LAN') (130) implemented using high-speed Ethernet.

The parallel computer (100) of FIG. 1 also includes a service node (116) coupled to the compute nodes through one of the networks (104). Service node (116) provides services common to pluralities of compute nodes, administering the configuration of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

In the example of FIG. 1, the compute nodes (102) have installed upon them a distributed compiler (200). A compiler is a software application that translates text written in a programming language into executable instructions of a target language, typically a hardware-specific machine language. The original sequence of text is usually referred to as the source code. The source code may be implemented using programming languages such as, for example, C, C++, assembly language, or others as will occur to those of skill in the art. The executable instructions in the target language are usually referred to as the object code. In addition to containing instructions executable on a specific hardware platform, object code may also include data for use at runtime, relocation information, program symbols (e.g., names of variable and functions) for linking or debugging purposes, and other debug information. The object code may be stored in a variety of formats including, for example, the Common Object File Format ('COFF'), the Executable and Linking Format ('ELF'), or any other as will occur to those of skill in the art. After the object code is generated, the compiler may then link or assemble the objects specified by the object code into an executable program capable of execution on a processor. Because many of the formats used for storing object code also specify the format of executable files, the executable file may also be specified using the Common Object File Format, the Executable and Linking Format, and other as will occur to those of skill in the art. Although the description above explains the operation of a compiler generally, readers will note that a distributed compiler is a compiler that divides up and coordinates the tasks of compilation and linking among more than one compute node. The distributed compiler (200) may communication between compute nodes using messaging passing operations such as, for example, those operations specified by the MPI family of specifications or the PVM family of specifications.

The distributed compiler (200) of FIG. 1 includes computer program instructions for generating an executable version of an application according to embodiments of the present invention. The distributed compiler (200) operates generally for generating an executable version of an application according to embodiments of the present invention by: receiving, by each compute node (102), a portion of source code for an application; compiling, in parallel by each compute node (102), the portion of the source code received by that compute node (102) into a portion of object code for the application; performing, in parallel by each compute node (102), inter-procedural analysis on the portion of the object code of the application for that compute node, including sharing results of the inter-procedural analysis among the compute nodes (102); optimizing, in parallel by each compute node (102), the portion of the object code of the application for that compute node using the shared results of the inter-procedural analysis; and generating the executable version of the application in dependence upon the optimized portions of the object code of the application.

Inter-procedural analysis ('IPA') refers to a compiler's analysis of how the procedures of an application may operate and be utilized during the application's execution. The compiler may use the results of the inter-procedural analysis to enhance the execution efficiency of the executable version of the application. For example, inter-procedural analysis may reveal that when a particular procedure performs its calculations, the same result is always returned. Thus, the compiler may configure the executable version of the application to return that value without incurring the overhead of performing the calculations. Using inter-procedural analysis, the compiler may determine that when a certain procedure is invoked within a loop, processing efficiency is enhanced by placing that procedure inline. Inter-procedural analysis may also reveal that certain procedures of the application are never used during execution by testing for certain branches in the execution sequence that are never taken. Accordingly, the compiler may remove those sections from the executable version of the application. The compiler may re-order the remaining sections of the executable version of the application for better memory layout and locality.

As described above, each of the compute nodes (102) performs inter-procedural analysis on the portion of the object code accessible by that compute node. However, readers will note that without sharing the IPA results among the compute nodes (102), each compute node (102) does not possess information on how all of the procedures of an application are utilized during the application's execution. Sharing the results of the inter-procedural analysis among compute nodes advantageously allows each compute node (102) to take advantage of the IPA results identified by the other compute nodes and more effectively optimize the executable version of the application.

The arrangement of nodes, networks, and I/O devices making up the exemplary system illustrated in FIG. 1 are for explanation only, not for limitation of the present invention. Data processing systems capable of generating an executable version of an application using a distributed compiler operating on a plurality of compute nodes according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Although the plurality of compute nodes described above for generating an executable version of an application using a distributed compiler operating on the plurality of compute nodes according to embodiments of the present invention are implemented in a parallel computer, readers will note that such an implementation is for explanation only and not for limitation. In fact, computing system architectures that include a plurality of compute nodes may also be useful such as, for example, a grid computing architecture, a cluster computing architecture, or any other parallel computing architecture as will occur to those of skill in the art.

Generating an executable version of an application using a distributed compiler operating on a plurality of compute nodes according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of generating an executable version of an application using a distributed compiler operating on a plurality of compute nodes according to embodiments of the present invention. The compute node (152) of FIG. 2 includes one or more processing cores (164) as well as computer memory (156) implemented, for example, as random access memory ('RAM'). The processing cores (164) are connected to computer memory (156) through a high-speed memory bus (154) and through a bus adapter (194) and an extension bus (168) to other components of the compute node (152).

Figure 2:
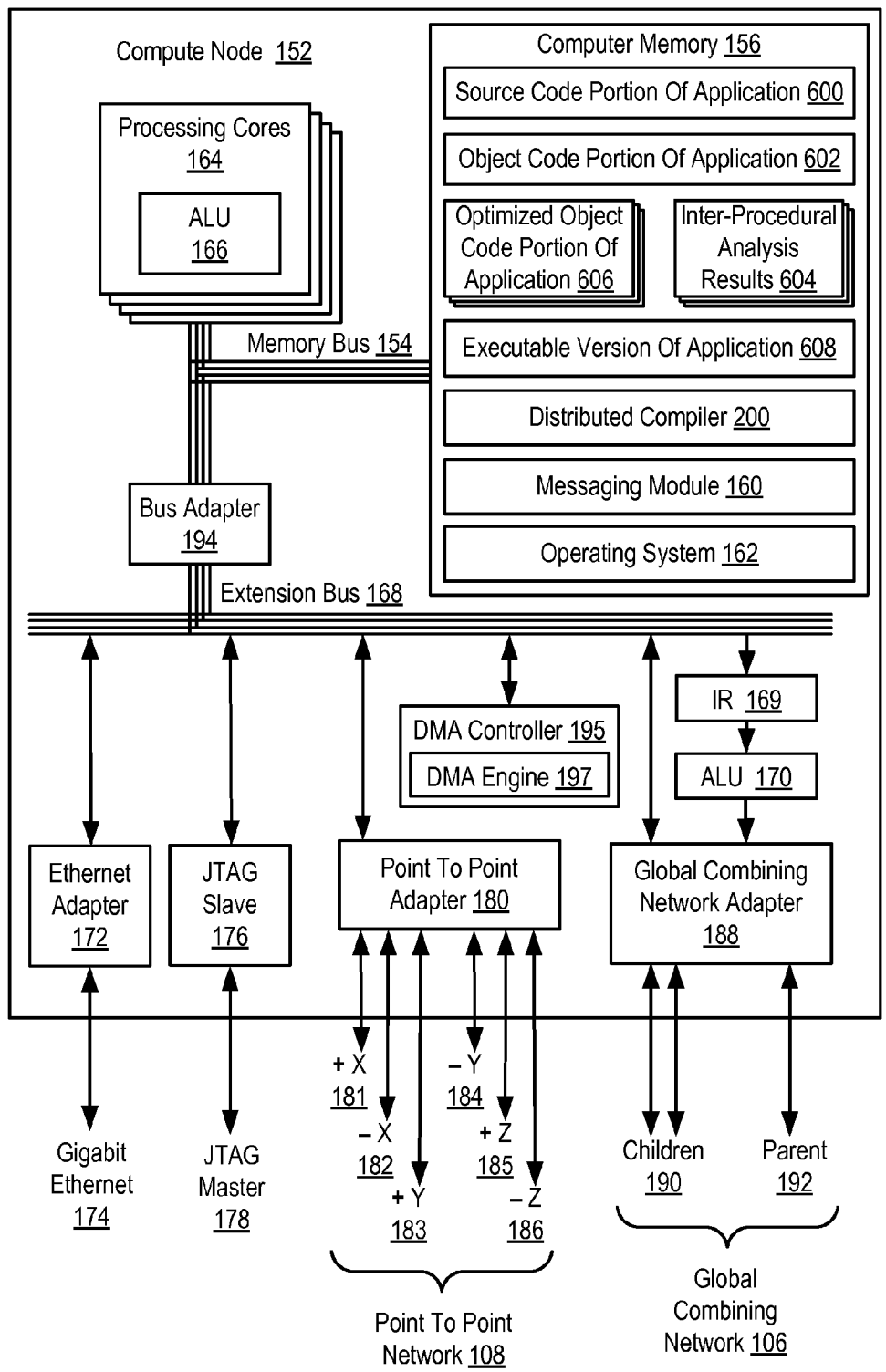
FIG. 2 sets forth a block diagram of an exemplary compute node useful in a parallel computer capable of generating an executable version of an application using a distributed compiler operating on a plurality of compute nodes according to embodiments of the present invention.

Stored in computer memory (156) of FIG. 2 is a distributed compiler (200), which includes computer program instructions capable of generating an executable version of an application according to embodiments of the present invention. The distributed compiler (200) of FIG. 2 operates generally for generating an executable version of an application according to embodiments of the present invention by: receiving, by each compute node, a portion (600) of source code for an application; compiling, in parallel by each compute node, the portion (600) of the source code received by that compute node into a portion (602) of object code for the application; performing, in parallel by each compute node, inter-procedural analysis on the portion (602) of the object code of the application for that compute node, including sharing results (604) of the inter-procedural analysis among the compute nodes; optimizing, in parallel by each compute node, the portion (602) of the object code of the application for that compute node using the shared results (604) of the inter-procedural analysis; and generating the executable version (608) of the application in dependence upon the optimized portions (606) of the object code of the application.

In the example of FIG. 2, the source code portion (600) of the application represents part of the programming language text that makes up the application. The programming language may include C, C++, FORTRAN, and any others as will occur to those of skill in the art. While the source code for the entire application may be stored in a set of many different source code files, each source code portion (600) may be implemented as one or more files within the set. In some other embodiments, each source code portion may even be implemented as a portion of a single source code file.

In the example of FIG. 2, the object code portion (602) of the application represents part of the code produced when the distributed compiler translates the source code of the application into platform-specific machine language. The object code portion (602) may be stored according to a variety of formats including, for example, the Common Object File Format, the Executable and Linking Format, or any other as will occur to those of skill in the art.

The inter-procedural analysis results (604) of FIG. 2 represent the compiler's analysis from all of the compute nodes regarding how the procedures of an application may operate and be utilized during the application's execution. The inter-procedural analysis results (604) may include information regarding pointer aliasing, global variable usage, function argument values, and so on. Pointer aliasing information reveals whether variables of the functions in the application access the same memory locations throughout execution. If variables of the functions in the application access the same memory locations throughout execution, then the compiler may need to maintain the original order in which the application accesses those locations using stores and loads. If variables do not reference the same memory locations throughout execution, then the compiler has more freedom to reorder the applications execution sequence to enhance performance. Global variable usage information reveals whether the functions of the application that utilize global variables modify the values of those variables. If the functions do not modify the value of the global variables, then the compiler remove any instructions in the functions that cache the value of the global variables before the function is executed and that restore the values of the global variables after then function's execution ends. Function argument value information reveals the range of values that are provided to a function through each of its arguments. Using function value information, the compiler may determine that a particular argument to a function is always a constant, which may allow the compiler to simplify the processing performed by the function. For example, if the function calculates the square root of the value passed to the function through the function's argument and function argument value information reveals that the argument value is always four, then the compiler may configure the function to return two each time the function is invoked rather than perform the actual calculation specified in the function.

In the example of FIG. 2, the optimized object code portions (606) represent the object code portion from each compute node that is optimized using the shared results (604) of the inter-procedural analysis. Similar to the object code portion (602), the optimized object code portions (606) may be stored according to a variety of formats including, for example, the Common Object File Format, the Executable and Linking Format, or any other as will occur to those of skill in the art.

In the example of FIG. 2, the executable version (608) of the application represents the optimized object code portions (606) from each of the compute nodes after those portions (606) are assembled or linked together into an executable program. The executable version (608) of the application may be stored in an executable file having a format specified according to the Common Object File Format, the Executable and Linking Format, or any other executable file format as will occur to those of skill in the art.

Also stored in computer memory (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in computer memory (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for generating an executable version of an application using a distributed compiler operating on a plurality of compute nodes according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (1 74). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in generating an executable version of an application using a distributed compiler operating on a plurality of compute nodes according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

Figure 3A:
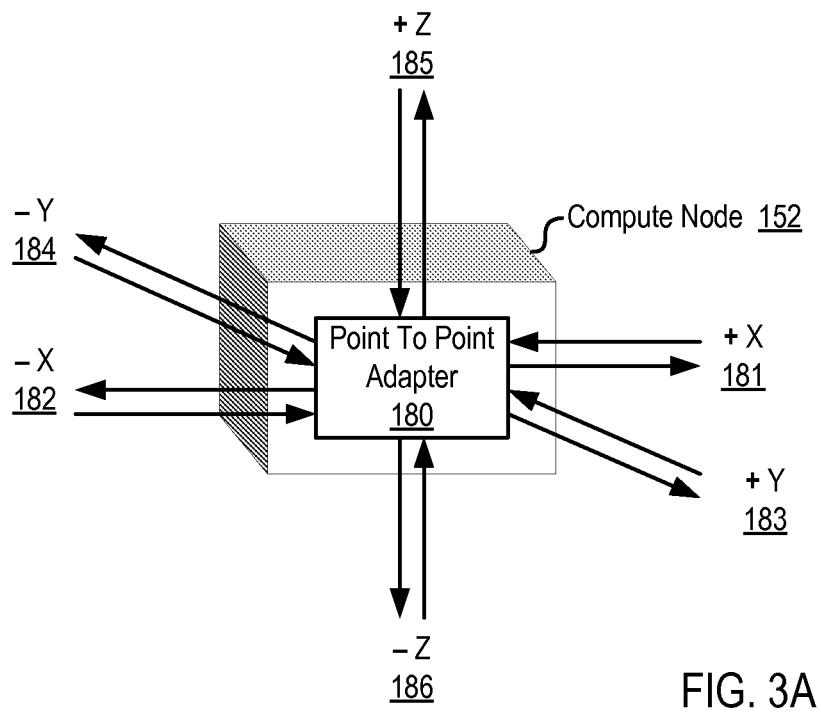
FIG. 3A illustrates an exemplary Point To Point Adapter useful in a parallel computer capable of generating an executable version of an application using a distributed compiler operating on a plurality of compute nodes according to embodiments of the present invention.

For further explanation, FIG. 3A illustrates an exemplary Point To Point Adapter (180) useful in a parallel computer capable of generating an executable version of an application using a distributed compiler operating on a plurality of compute nodes according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
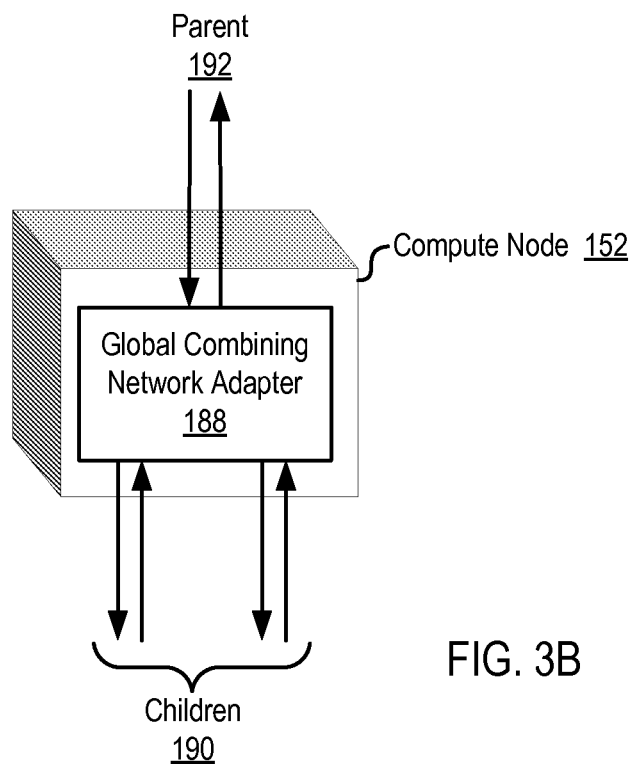
FIG. 3B illustrates an exemplary Global Combining Network Adapter useful in a parallel computer capable of generating an executable version of an application using a distributed compiler operating on a plurality of compute nodes according to embodiments of the present invention.

For further explanation, FIG. 3B illustrates an exemplary Global Combining Network Adapter (188) useful in a parallel computer capable of generating an executable version of an application using a distributed compiler operating on a plurality of compute nodes according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes (190) through two links. Each link to each child node (190) is formed from two unidirectional data communications paths. Global Combining Network Adapter (188) also provides data communication to and from a parent node (192) through a link form from two unidirectional data communications paths.

Figure 4:
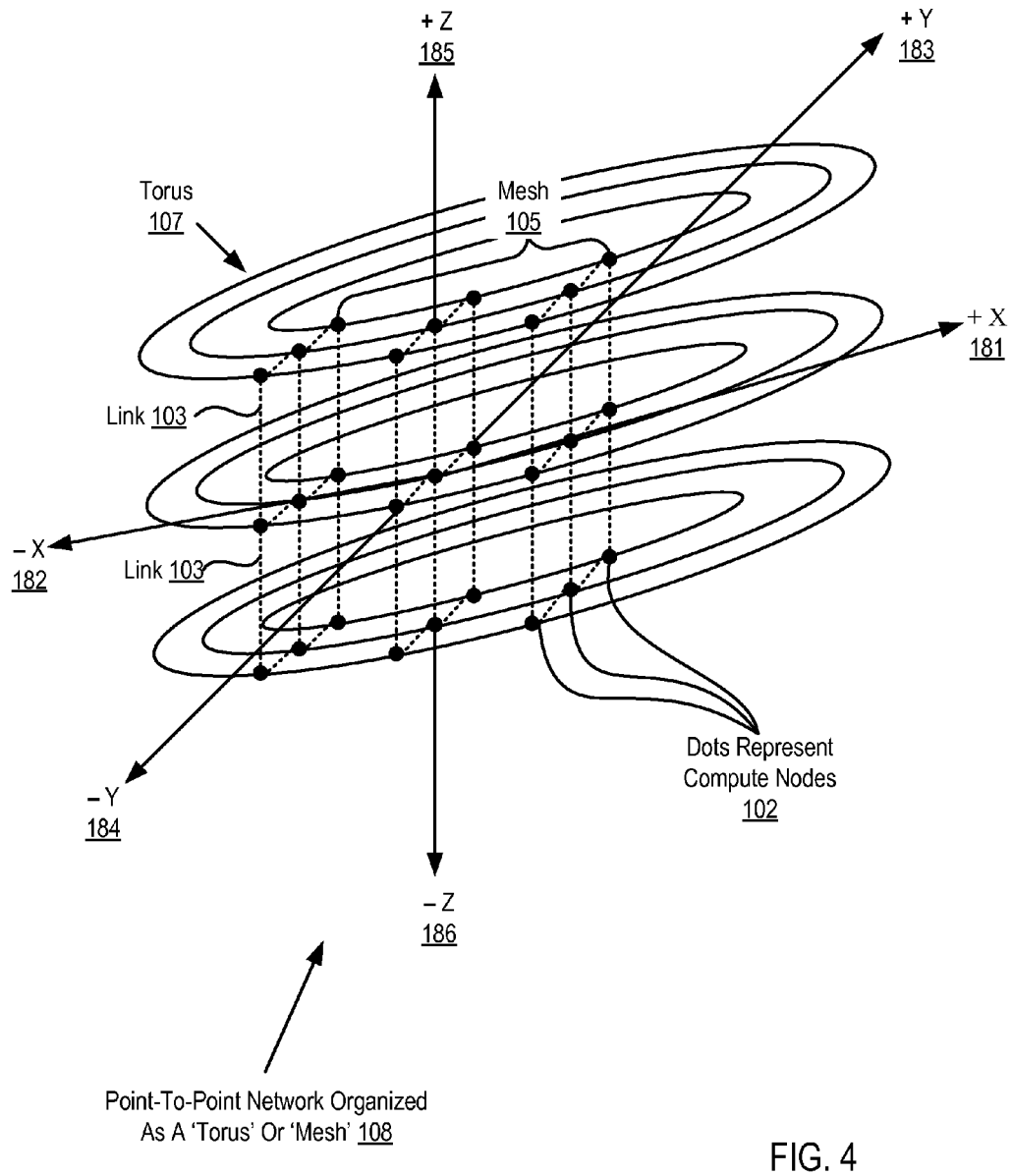
FIG. 4 sets forth a line drawing illustrating an exemplary data communications network optimized for point to point operations useful in a parallel computer capable of generating an executable version of an application using a distributed compiler operating on a plurality of compute nodes according to embodiments of the present invention.

For further explanation, FIG. 4 sets forth a line drawing illustrating an exemplary data communications network (108) optimized for point to point operations useful in a parallel computer capable of generating an executable version of an application using a distributed compiler operating on a plurality of compute nodes in accordance with embodiments of the present invention. In the example of FIG. 4, dots represent compute nodes (102) of a parallel computer, and the dotted lines between the dots represent network links (103) between compute nodes. The network links are implemented with point to point data communications adapters similar to the one illustrated for example in FIG. 3A, with network links on three axes, x, y, and z, and to and from in six directions +x (181), −x (182), +y (183), −y (184), +z (185), and −z (186). The links and compute nodes are organized by this data communications network optimized for point to point operations into a three dimensional mesh (1 05). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in generating an executable version of an application using a distributed compiler operating on a plurality of compute nodes in accordance with embodiments of the present invention may contain only a few compute nodes or may contain thousands of compute nodes.

Figure 5:
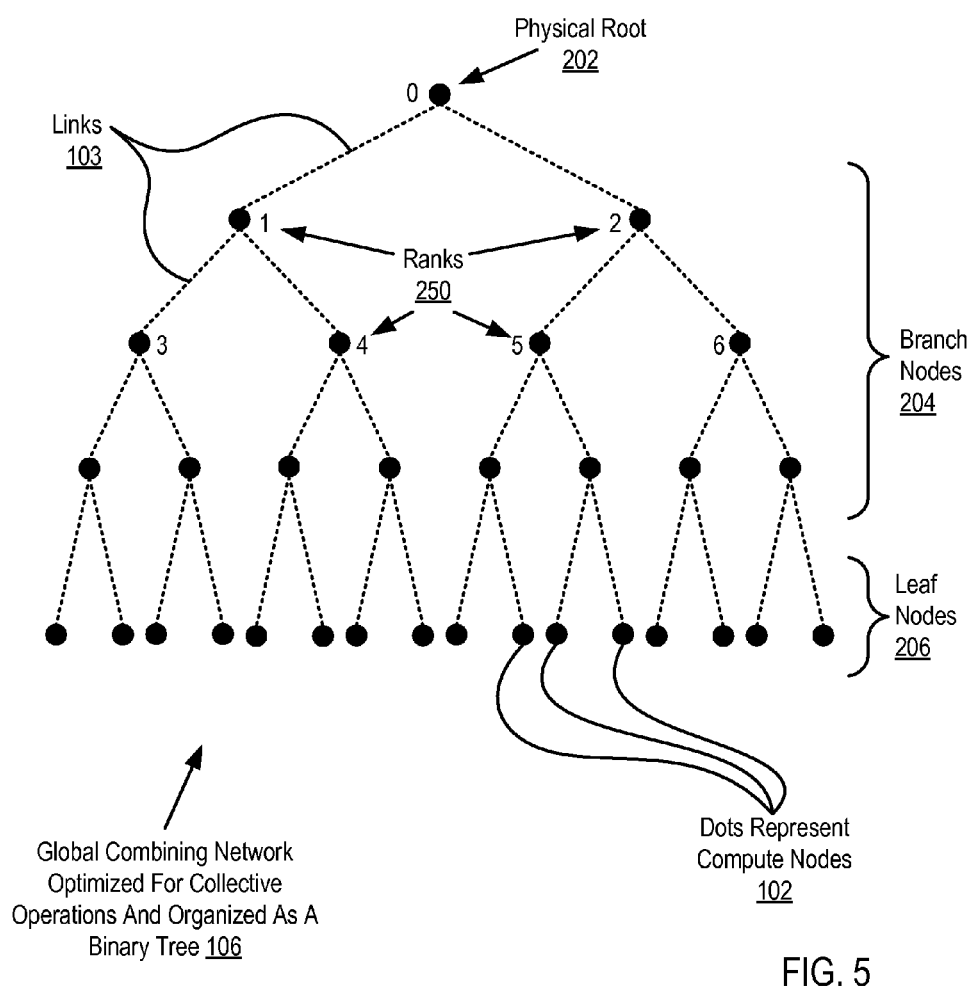
FIG. 5 sets forth a line drawing illustrating an exemplary data communications network optimized for collective operations useful in a parallel computer capable of generating an executable version of an application using a distributed compiler operating on a plurality of compute nodes according to embodiments of the present invention.

For further explanation, FIG. 5 sets forth a line drawing illustrating an exemplary data communications network (106) optimized for collective operations useful in a parallel computer capable of generating an executable version of an application using a distributed compiler operating on a plurality of compute nodes in accordance with embodiments of the present invention. The example data communications network of FIG. 5 includes network links connected to the compute nodes so as to organize the compute nodes as a tree. In the example of FIG. 5, dots represent compute nodes (102) of a parallel computer, and the dotted lines (103) between the dots represent network links between compute nodes. The network links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in a parallel computer for generating an executable version of an application using a distributed compiler operating on a plurality of compute nodes in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6A:
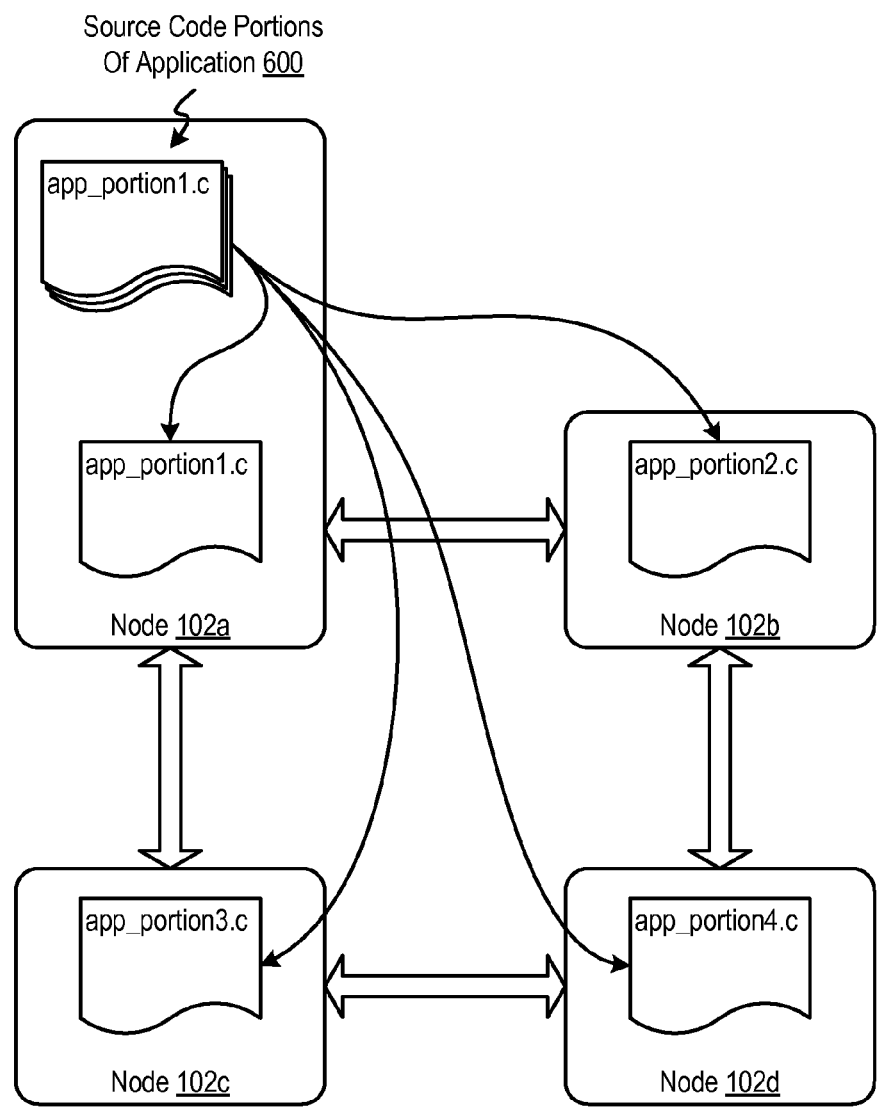
FIG. 6A sets forth a line drawing illustrating exemplary compute nodes useful in generating an executable version of an application using a distributed compiler operating on a plurality of compute nodes according to embodiments of the present invention after each compute node receives a portion of source code for an application.

For further explanation, FIG. 6A sets forth a line drawing illustrating exemplary compute nodes (102) useful in generating an executable version of an application using a distributed compiler operating on a plurality of compute nodes according to embodiments of the present invention after each compute node (102) receives a portion (600) of source code for an application. The example of FIG. 6A includes four compute nodes (102). The compute nodes (102) are connected for data communications using a plurality of data communications networks. At least one of the data communications networks is optimized for point to point operations, and at least one of the data communications networks is optimized for collective operations.

In the example of FIG. 6A, compute node (102a) includes source code portions (606) of an application and distributes those portions (606) among the compute nodes (102). Each compute node (102) of FIG. 6A receives a portion (600) of source code for an application. In the example of FIG. 6A, each source code portion (600) is implemented in the ANSI C programming language and stored in a source file identified with a '.c' extension. Readers will note however that such an implementation is for explanation only and not for limitation. In the example of FIG. 6A, compute node (102a) receives the source code portion contained in the 'app_portion1.c' source file. Compute node (102b) receives the source code portion contained in the 'app_portion2.c' source file. Compute node (102c) receives the source code portion contained in the 'app_portion3.c' source file. Compute node (102d) receives the source code portion contained in the 'app_portion4.c' source file.

Figure 6B:
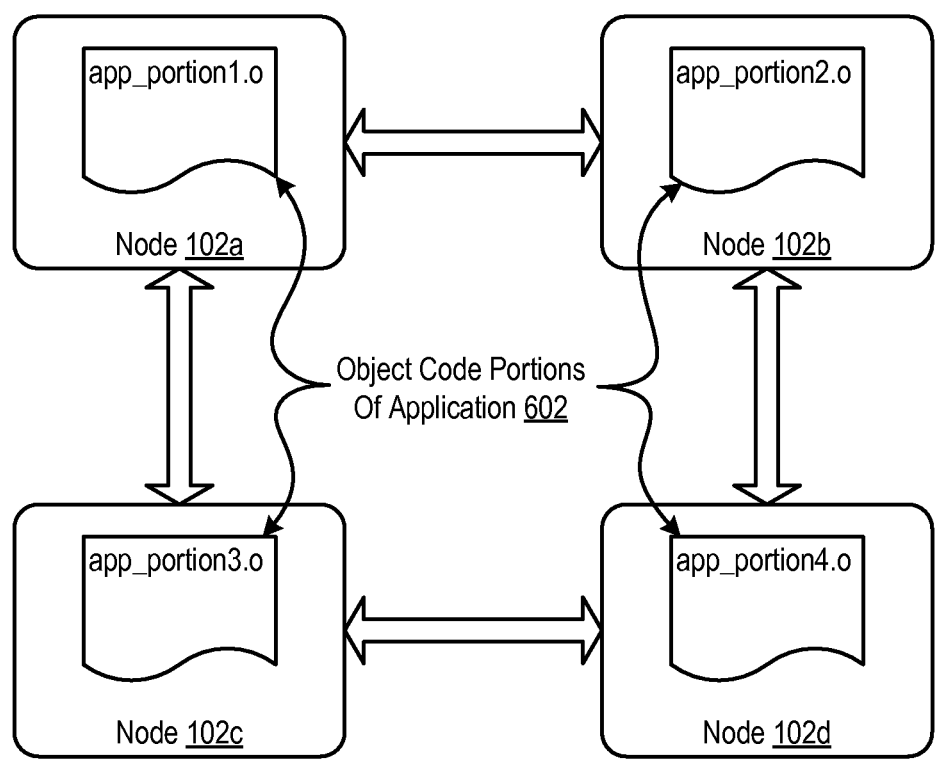
FIG. 6B sets forth a line drawing illustrating the exemplary compute nodes of FIG. 6A useful in embodiments of the present invention after each compute node compiles, in parallel, the portion of the source code received by that compute node into a portion of object code for the application.

FIG. 6B sets forth a line drawing illustrating the exemplary compute nodes of FIG. 6A useful in embodiments of the present invention after each compute node (102) compiles, in parallel, the portion of the source code received by that compute node into a portion (602) of object code for the application. The object code portions (602) of FIG. 6B are stored in object code files identified by the '.o' extension. Compute node (102a) compiles the source code portion stored in 'app_portion1.c' of FIG. 6A into an object code portion stored in the 'app_portion1.o' object code file. Compute node (102b) compiles the source code portion stored in 'app_portion2.c' of FIG. 6A into an object code portion stored in the 'app_portion2.o' object code file. Compute node (102c) compiles the source code portion stored in 'app_portion3.c' of FIG. 6A into an object code portion stored in the 'app_portion3.o' object code file. Compute node (102d) compiles the source code portion stored in 'app_portion4.c' of FIG. 6A into an object code portion stored in the 'app_portion4.o' object code file. Together, the object code portions stored in object code files app_portion1.o, app_portion2.o, app_portion3.o, and app_portion4.o make up the object code for the application.

Figure 6C:
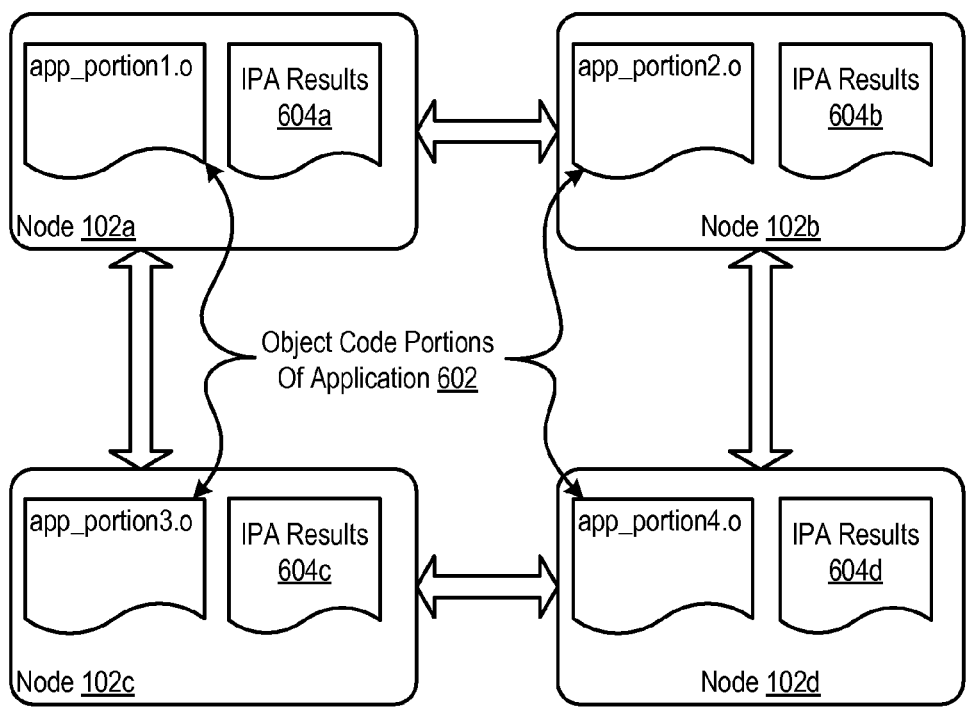
FIG. 6C sets forth a line drawing illustrating the exemplary compute nodes of FIG. 6B useful in embodiments of the present invention after each compute node performs, in parallel, inter-procedural analysis on the portion of the object code of the application for that compute node.

FIG. 6C sets forth a line drawing illustrating the exemplary compute nodes of FIG. 6B useful in embodiments of the present invention after each compute node (102) performs, in parallel, inter-procedural analysis on the portion of the object code of the application for that compute node. Compute node (102a) performs inter-procedural analysis on the object code portion contained in the 'app_portion1.o' object code file and stores the IPA results (604a) in the node's memory. Compute node (102b) performs inter-procedural analysis on the object code portion contained in the 'app_portion2.o' object code file and stores the IPA results (604b) in the node's memory. Compute node (102c) performs inter-procedural analysis on the object code portion contained in the 'app_portion3.o' object code file and stores the IPA results (604c) in the node's memory. Compute node (102d) performs inter-procedural analysis on the object code portion contained in the 'app_portion4.o' object code file and stores the IPA results (604d) in the node's memory.

Figure 6D:
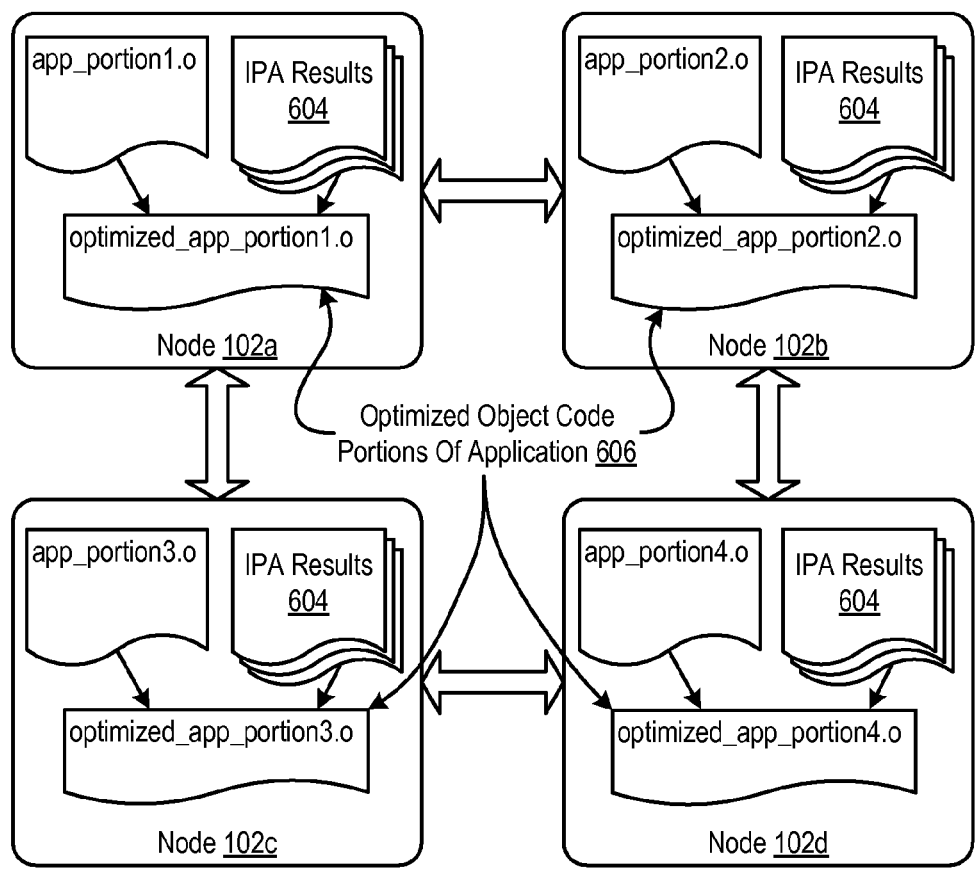
FIG. 6D sets forth a line drawing illustrating the exemplary compute nodes of FIG. 6C useful in embodiments of the present invention after each compute node shares results of the inter-procedural analysis among the compute nodes and optimizes, in parallel, the portion of the object code of the application for that compute node using the shared results of the inter-procedural analysis.

FIG. 6D sets forth a line drawing illustrating the exemplary compute nodes of FIG. 6C useful in embodiments of the present invention after each compute node (102) shares results (604) of the inter-procedural analysis among the compute nodes (102) and optimizes, in parallel, the portion of the object code of the application for that compute node using the shared results (604) of the inter-procedural analysis. Using the shared IPA results (604), compute node (102a) optimizes the object code portion contained in the 'app_portion1.o' object code file and stores the optimized object code portion in the 'optimized_app_portion1.o' object code file. Using the shared IPA results (604), compute node (102b) optimizes the object code portion contained in the 'app_portion2.o' object code file and stores the optimized object code portion in the 'optimized_app_portion2.o' object code file. Using the shared IPA results (604), compute node (102c) optimizes the object code portion contained in the 'app_portion3.o' object code file and stores the optimized object code portion in the 'optimized_app_portion3.o' object code file. Using the shared IPA results (604), compute node (102d) optimizes the object code portion contained in the 'app_portion4.o' object code file and stores the optimized object code portion in the 'optimized_app_portion4.o' object code file. Together, the optimized object code portions (606) stored in object code files optimized_app_portion1.o, optimized_app_portion2.o, optimized_app_portion3.o, and optimized_app_portion4.o make up the optimized object code for the application.

Figure 6E:
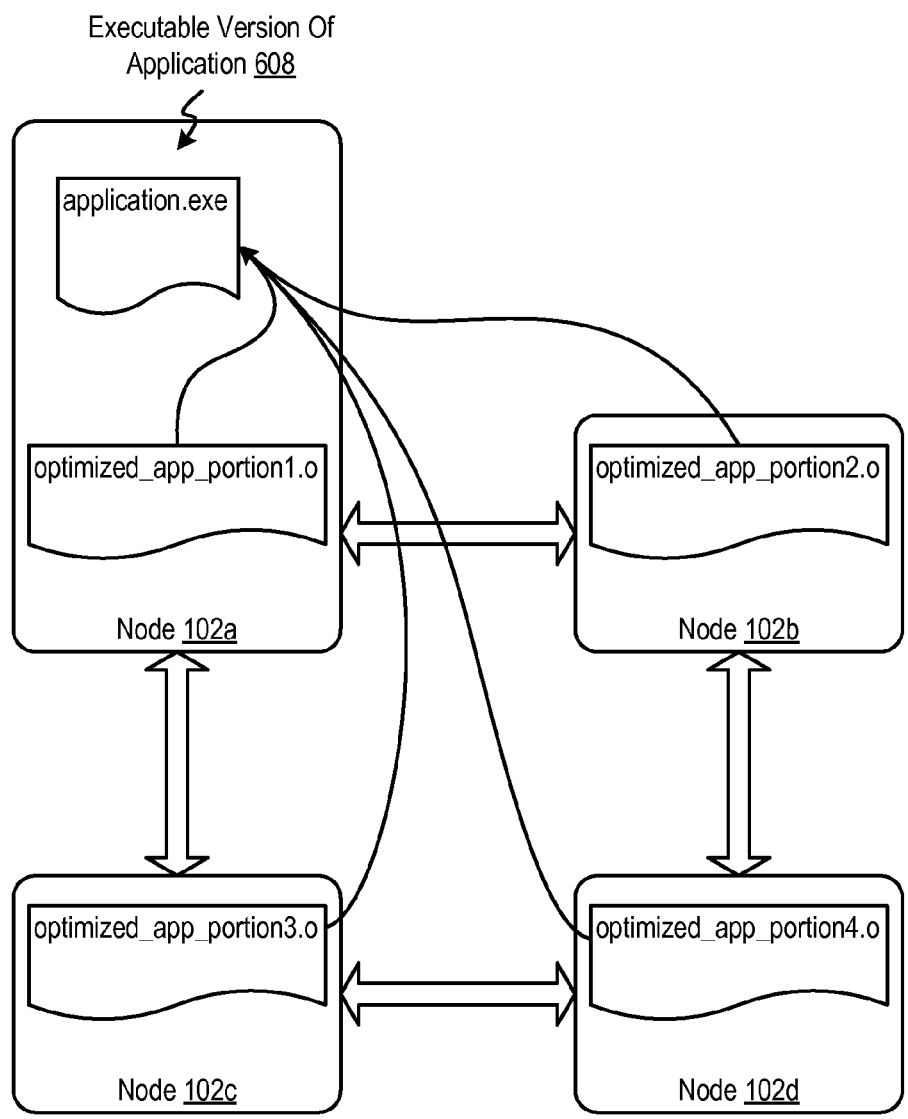
FIG. 6E sets forth a line drawing illustrating the exemplary compute nodes of FIG. 6D useful in embodiments of the present invention after one of the compute nodes generates the executable version of the application in dependence upon the optimized portions of the object code of the application.

FIG. 6E sets forth a line drawing illustrating the exemplary compute nodes (102) of FIG. 6D useful in embodiments of the present invention after one of the compute nodes (102) generates the executable version (608) of the application in dependence upon the optimized portions of the object code of the application. In the example of FIG. 6E, compute node (102a) generates the executable version (608) of the application in dependence upon the optimized object code portions contained in the following object code files stored on the compute node (102): optimized_app_portion1.o, optimized_app_portion2.o, optimized_app_portion3.o, and optimized_app_portion4.o. Although FIG. 6E illustrates the executable version (608) of the application as a single executable file with an extension of '.exe,' readers will note that the executable version (608) of the application may be implemented using multiple files including for example, dynamically linked libraries, statically linked libraries, or other executable files as will occur to those of skill in the art.

Figure 7:
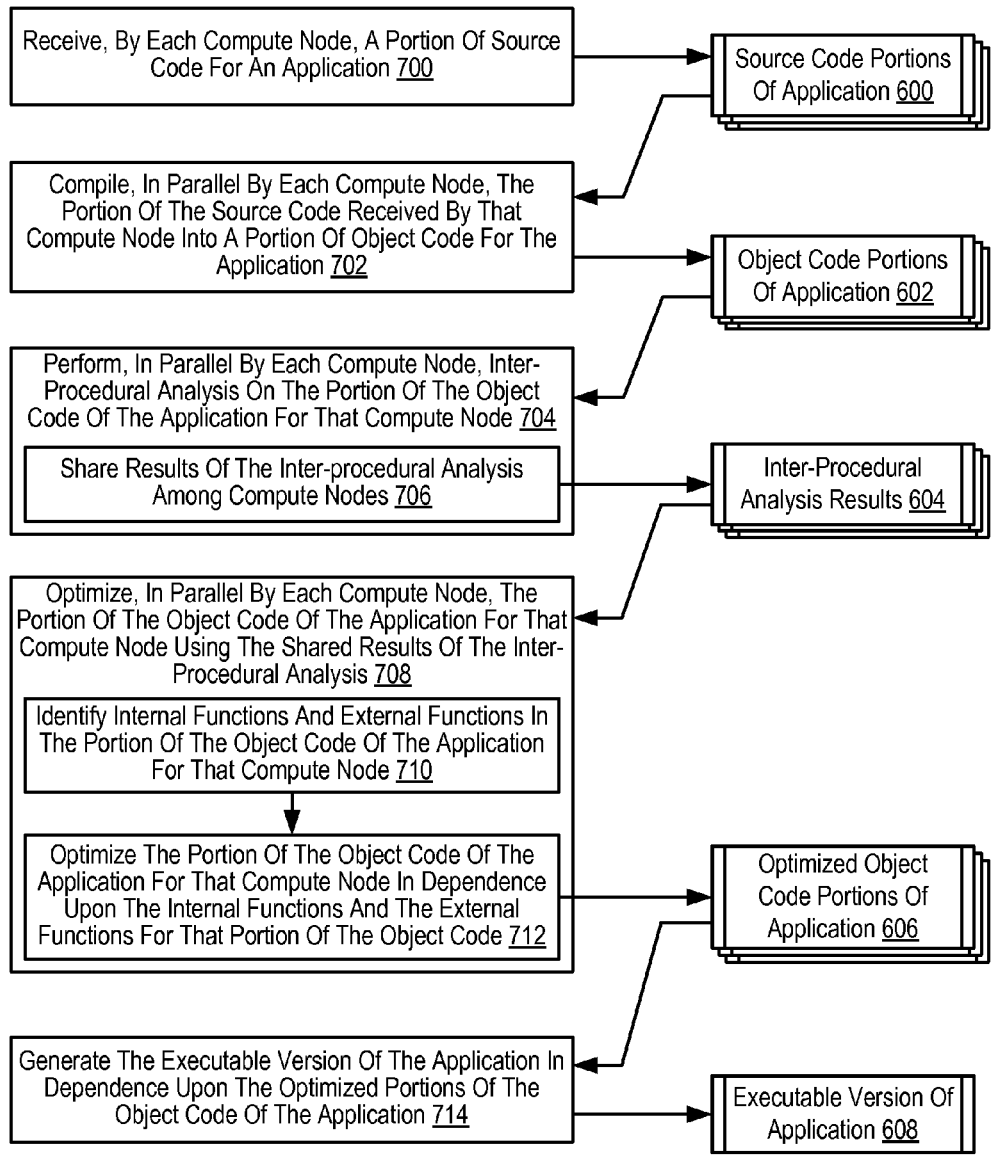
FIG. 7 sets forth a flow chart illustrating an exemplary method for generating an executable version of an application using a distributed compiler operating on a plurality of compute nodes according to embodiments the present invention.

For further explanation, FIG. 7 sets forth a flow chart illustrating an exemplary method for generating an executable version of an application using a distributed compiler operating on a plurality of compute nodes according to embodiments the present invention. The plurality of compute nodes are connected for data communications using a plurality of data communications networks. At least one of the data communications networks is optimized for point to point operations, and at least one of the data communications networks is optimized for collective operations.

The method of FIG. 7 includes receiving (700), by each compute node, a portion (600) of source code for an application. As explained above, each source code portion (600) of the application represents part of the programming language text that makes up the application. The programming language may include C, C++, FORTRAN, and any others as will occur to those of skill in the art. While the source code for the entire application may be stored in a set of many different source code files, each source code portion (600) may be implemented as one or more files within the set. In some other embodiments, each source code portion may even be implemented as a portion of a single source code file. In the method of FIG. 7, each compute node may receive (700) a portion (600) of source code for an application from a service node or one of the compute nodes that stores all of the source code portions (600). Each compute node may receive (700) a portion (600) of source code for an application according to the method of FIG. 7 using a collective operation such as, for example, the 'MPI_SCATTER' or 'MPI_SCATTERV' operations described in the MPI family of specifications.

The method of FIG. 7 includes compiling (702), in parallel by each compute node, the portion (600) of the source code received by that compute node into a portion (602) of object code for the application. Each object code portion (602) of the application represents part of the code produced when the distributed compiler translates the source code of the application into platform-specific machine language. The object code portion (602) may be stored according to a variety of formats including, for example, the Common Object File Format, the Executable and Linking Format, or any other as will occur to those of skill in the art. Each compute node may compile (702), in parallel, the portion (600) of the source code received by that compute node into a portion (602) of object code for the application according to the method of FIG. 7 by performing lexical analysis, preprocessing, syntactic analysis, and semantic analysis on that node's source code portion (600) and generating a portion (602) of object code based on the node's analysis. Lexical analysis refers to the process of converting a sequence of characters in each source code portion (600) into a sequence of tokens. Preprocessing refers to the process of performing relatively simple textual substitutions and macro expansions based on directives in each source code portion (600). Syntactic analysis refers to process of analyzing a sequence of tokens to identify grammatical structures with respect to a grammar template. Semantic analysis refers to the process of identifying the task performed by a sequence of token.

Readers will note that the compiling process by each compute node occurs 'in parallel.' The phrase 'in parallel' refers to the fact that compilation process occurs for the most part concurrently on each node. Though the compilation process occur concurrently, readers will note that it need not occur simultaneously and need not begin and end on each node at precisely the same time. Rather, performance of the compilation process on each node generally overlaps compilation performance occurring on the other node. In such a manner, compiling in parallel contrasts with each node compiling its source node portion sequentially with respect to the other compute nodes—that is, one node at a time.

The method of FIG. 7 also includes performing (704), in parallel by each compute node, inter-procedural analysis on the portion of the object code of the application for that compute node. As mentioned above, inter-procedural analysis refers to a compiler's analysis of how the procedures of an application may operate and be utilized during the application's execution. Each compute node may perform (704), in parallel, inter-procedural analysis on the portion of the object code of the application for that compute node according to the method of FIG. 7 by determining pointer aliasing information, global variable usage information, and function argument value information. Pointer aliasing information reveals whether variables of the functions in the application access the same memory locations throughout execution. Global variable usage information reveals whether the functions of the application that utilize global variables modify the values of those variables. Function argument value information reveals the range of values that are provided to a function through each of its arguments.

Each compute node performs (704), in parallel, inter-procedural analysis on the portion of the object code of the application for that compute node according to the method of FIG. 7 by sharing (706) results (604) of the inter-procedural analysis among the compute nodes. Sharing (706) results (604) of the inter-procedural analysis among the compute nodes according to the method of FIG. 7 may be carried out by sharing pointer aliasing information among the compute nodes, sharing global variable usage information among the compute nodes, and sharing function argument value information among the compute nodes. The compute nodes may share (706) results (604) of the inter-procedural analysis among the compute nodes according to the method of FIG. 7 using a collective operation such as, for example, the 'MPI_ALLTOALL' or 'MPI_ALLTOALLV' operations described in the MPI family of specifications. Readers will note that the process of inter-procedural analysis occurs 'in parallel' in a similar manner in which the compilation process occurs 'in parallel.'

The method of FIG. 7 includes optimizing (706), in parallel by each compute node, the portion (602) of the object code of the application for that compute node using the shared results (604) of the inter-procedural analysis. Each compute node may optimize (706), in parallel, the portion (602) of the object code of the application for that compute node using the shared results (604) of the inter-procedural analysis according to the method of FIG. 7 by removing branches of object code that will not be executed during the execution sequence. Each compute node may also optimize (706) the portion (602) of the object code according to the method of FIG. 7 by eliminating sections of code that cache and restore global variables during execution of a function because global variable usage information indicates that the function does not change the global variable values. Further, each compute node may optimize (706) the portion (602) of the object code according to the method of FIG. 7 by reordering the execution sequence of code that accesses the same pointer variable to improve execution performance when the pointer aliasing information reveals that the pointer variable specifies different memory locations in the reorder sections of code. In addition, each compute node may optimize (706) the portion (602) of the object code according to the method of FIG. 7 by simplifying the object code of functions where the function's arguments are known from the function value information. Readers will note that the optimization process occurs 'in parallel' in a similar manner in which the compilation process occurs 'in parallel.'

A distributed compiler may make certain optimizations based on whether the function is an internal function or an external function. An internal function is a particular function on a particular node that is invoked only by other functions in the object code portions being processed by that particular node. That is, an internal function is only invoked by other functions on the same node. An external function is a particular function on a particular node that is invoked by other functions in the object code portions being processed by at least one other compute node. That is, an external function is invoked by a function on another node. For an example of optimizations based on whether a function is an internal function or an external function, consider an optimization in which the compiler decides to place a called function inline with the calling function that invokes the called function. When the called function is an internal function, the compiler has the option of placing the code of that called function inline with the calling functions that invokes the called function. However, when the called function is an external function, the compiler does not place the code of that called function inline with the calling functions that invokes the called function because other functions on different nodes still need the function's interface for invocation.

In such a manner, optimizing (706), in parallel by each compute node, the portion (602) of the object code of the application for that compute node using the shared results (604) of the inter-procedural analysis according to the method of FIG. 7 includes identifying (710) internal functions and external functions in the portion (602) of the object code of the application for that compute node and optimizing (712) the portion of the object code of the application for that compute node in dependence upon the internal functions and the external functions for that portion (602) of the object code. Each compute node may identify (710) internal functions and external functions in the portion (602) of the object code of the application for that compute node according to the method of FIG. 7 by determining which functions in the object code portion (602) for that compute node are invoked by object code portions (602) on other compute nodes using the inter-procedure analysis results (604). The compiler may identify functions invoked by object code portions (602) on other compute nodes as external functions and the remaining functions as internal functions.

The method of FIG. 7 includes generating (714) the executable version (608) of the application in dependence upon the optimized portions (606) of the object code of the application. Generating (714) the executable version (608) of the application in dependence upon the optimized portions (606) of the object code of the application according to the method of FIG. 7 may be carried out by a service node or one of the compute nodes storing the optimized object code portions (606). One of the compute nodes may generate (714) the executable version (608) of the application according to the method of FIG. 7 collecting the optimized object code portions (606) from each of the compute nodes and linking the optimized object code portions (606) together into the executable version (608) of the application. The compute node may collect the optimized object code portions (606) from each of the compute nodes using a collective operation such as, for example, the 'MPI_GATHER' or 'MPI_GATHERV' operations described in the MPI family of specifications.

Exemplary embodiments of the present invention are described largely in the context of a fully functional parallel computer system for generating an executable version of an application using a distributed compiler operating on a plurality of compute nodes. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of generating an executable version of an application using a distributed compiler operating on a plurality of compute nodes, the method comprising:
   receiving, by each compute node, a portion of source code for an application;
   compiling, in parallel by each compute node, the portion of the source code received by that compute node into a portion of object code for the application;
   performing, in parallel by each compute node, inter-procedural analysis on the portion of the object code of the application for that compute node, including sharing results of the inter-procedural analysis among the compute nodes, wherein sharing the results among the compute nodes further comprises performing by the compute nodes an All-To-All collective operation;
   optimizing, in parallel by each compute node, the portion of the object code of the application for that compute node using the shared results of the inter-procedural analysis including:
      identifying internal functions and external functions in the portion of the object code of the application for that compute node, wherein identifying external functions includes determining that a function in the portion of the object code is invoked by object code portions on another compute node using the shared results of the inter-procedural analysis; and
      optimizing the portion of the object code of the application for that compute node in dependence upon the internal functions and the external functions for that portion of the object code; and
   generating the executable version of the application in dependence upon the optimized portions of the object code of the application.

2. The method of claim 1 wherein sharing results of the inter-procedural analysis among compute nodes further comprises sharing pointer aliasing information among the compute nodes.

3. The method of claim 1 wherein sharing results of the inter-procedural analysis among compute nodes further comprises sharing global variable usage information among the compute nodes.

4. The method of claim 1 wherein sharing results of the inter-procedural analysis among compute nodes further comprises sharing function argument value information among the compute nodes.

5. The method of claim 1 wherein generating an executable version of an application using a distributed compiler operating on a plurality of compute nodes further comprises generating the executable version of the application using the distributed compiler operating on the plurality of compute nodes of a parallel computer, the plurality of compute nodes connected for data communications using a plurality of data communications networks, at least one of the data communications networks optimized for point to point operations, and at least one of the data communications networks optimized for collective operations.

6. A parallel computer for generating an executable version of an application using a distributed compiler operating on a plurality of compute nodes, the parallel computer comprising one or more computer processors and computer memory operatively coupled to the computer processors, the computer memory having disposed within it computer program instructions configured to:
   receiving, by each compute node, a portion of source code for an application;
   compiling, in parallel by each compute node, the portion of the source code received by that compute node into a portion of object code for the application;
   performing, in parallel by each compute node, inter-procedural analysis on the portion of the object code of the application for that compute node, including sharing results of the inter-procedural analysis among the compute nodes, wherein sharing the results among the compute nodes further comprises performing by the compute nodes an All-To-All collective operation;

optimizing, in parallel by each compute node, the portion of the object code of the application for that compute node using the shared results of the inter-procedural analysis including:
   identifying internal functions and external functions in the portion of the object code of the application for that compute node, wherein identifying external functions includes determining that a function in the portion of the object code is invoked by object code portions on another compute node using the shared results of the inter-procedural analysis; and
   optimizing the portion of the object code of the application for that compute node in dependence upon the internal functions and the external functions for that portion of the object code; and
generating the executable version of the application in dependence upon the optimized portions of the object code of the application.

7. The parallel computer of claim 6 wherein sharing results of the inter-procedural analysis among compute nodes further comprises sharing pointer aliasing information among the compute nodes.

8. The parallel computer of claim 6 wherein sharing results of the inter-procedural analysis among compute nodes further comprises sharing global variable usage information among the compute nodes.

9. The parallel computer of claim 6 wherein sharing results of the inter-procedural analysis among compute nodes further comprises sharing function argument value information among the compute nodes.

10. The parallel computer of claim 6 wherein the plurality of compute nodes are connected for data communications using a plurality of data communications networks, at least one of the data communications networks optimized for point to point operations, and at least one of the data communications networks optimized for collective operations.

11. A computer program product for generating an executable version of an application using a distributed compiler operating on a plurality of compute nodes, the computer program product comprising a non-transmission, computer readable medium, the non-transmission, computer readable medium comprising computer program instructions configured to:
   receiving, by each compute node, a portion of source code for an application;
   compiling, in parallel by each compute node, the portion of the source code received by that compute node into a portion of object code for the application;
   performing, in parallel by each compute node, inter-procedural analysis on the portion of the object code of the application for that compute node, including sharing results of the inter-procedural analysis among the compute nodes, wherein sharing the results among the compute nodes further comprises performing by the compute nodes an All-To-All collective operation;
   optimizing, in parallel by each compute node, the portion of the object code of the application for that compute node using the shared results of the inter-procedural analysis including:
      identifying internal functions and external functions in the portion of the object code of the application for that compute node, wherein identifying external functions includes determining that a function in the portion of the object code is invoked by object code portions on another compute node using the shared results of the inter-procedural analysis; and
      optimizing the portion of the object code of the application for that compute node in dependence upon the internal functions and the external functions for that portion of the object code; and
   generating the executable version of the application in dependence upon the optimized portions of the object code of the application.

12. The computer program product of claim 11 wherein sharing results of the inter-procedural analysis among compute nodes further comprises sharing pointer aliasing information among the compute nodes.

13. The computer program product of claim 11 wherein sharing results of the inter-procedural analysis among compute nodes further comprises sharing global variable usage information among the compute nodes.

14. The computer program product of claim 11 wherein sharing results of the inter-procedural analysis among compute nodes further comprises sharing function argument value information among the compute nodes.

15. The computer program product of claim 11 wherein generating an executable version of an application using a distributed compiler operating on a plurality of compute nodes further comprises generating the executable version of the application using the distributed compiler operating on the plurality of compute nodes of a parallel computer, the plurality of compute nodes connected for data communications using a plurality of data communications networks, at least one of the data communications networks optimized for point to point operations, and at least one of the data communications networks optimized for collective operations.

* * * * *